United States Patent
Zhang et al.

(10) Patent No.: US 9,575,199 B2
(45) Date of Patent: Feb. 21, 2017

(54) DOWNHOLE FLUID RESISTIVITY SENSOR SYSTEMS AND METHODS

(75) Inventors: Wei Zhang, Houston, TX (US); Lizheng Zhang, Humble, TX (US); Li Gao, Katy, TX (US); David Earl Ball, Meadows Place, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 202 days.

(21) Appl. No.: 14/388,193

(22) PCT Filed: Mar. 28, 2012

(86) PCT No.: PCT/US2012/030851
§ 371 (c)(1),
(2), (4) Date: Sep. 25, 2014

(87) PCT Pub. No.: WO2013/147758
PCT Pub. Date: Oct. 3, 2013

(65) Prior Publication Data
US 2015/0168582 A1 Jun. 18, 2015

(51) Int. Cl.
*G01V 3/02* (2006.01)
*G01V 3/20* (2006.01)
*E21B 49/08* (2006.01)

(52) U.S. Cl.
CPC ............ *G01V 3/02* (2013.01); *E21B 49/08* (2013.01); *G01V 3/20* (2013.01)

(58) Field of Classification Search
CPC .............. E21B 49/08; G01V 3/02; G01V 3/20
(Continued)

(56) References Cited

U.S. PATENT DOCUMENTS

| 2,824,689 | A | * | 2/1958 | Aronofsky | ............... G01V 3/20 703/10 |
| 4,573,532 | A | | 3/1986 | Blake | |

(Continued)

FOREIGN PATENT DOCUMENTS

WO WO-2013/147758 10/2013

OTHER PUBLICATIONS

PCT International Search Report and Written Opinion, dated Jul. 18, 2012, Appl No. PCT/US2012/030851, "Downhole Fluid Resistivity Sensor Systems and Methods", filed Mar. 28, 2012, 8 pgs.

(Continued)

*Primary Examiner* — Jay Patidar
(74) *Attorney, Agent, or Firm* — Iselin Law PLLC; Benjamin Fite

(57) ABSTRACT

Disclosed is a downhole fluid resistivity sensor that includes a ceramic cylinder having a fluid-contacting surface, and at least four metal pins that penetrate a wall of the ceramic cylinder at axially-spaced locations. The pins are bonded to the ceramic to form a pressure seal. The sensor may include a circuit that injects current into a fluid via an outer two of the pins, and measures a resulting voltage via an inner two of the pins. The circuit may also provide an indication of fluid resistivity based at least in part on the resulting voltage. At each of the axially-spaced locations, a set of multiple pins may penetrate the wall to contact the fluid at circumferentially-spaced positions. The fluid-contacting surface may be an inner surface or an outer surface of the ceramic cylinder. A downhole fluid resistivity measurement method is also described.

19 Claims, 4 Drawing Sheets

(58) Field of Classification Search
USPC .................................. 324/324, 376, 377, 691
See application file for complete search history.

(56) References Cited

U.S. PATENT DOCUMENTS

| | | | |
|---|---|---|---|
| 5,095,273 A * | 3/1992 | Kennedy | G01N 33/24 |
| | | | 324/376 |
| 6,826,964 B2 | 12/2004 | Nyfors | |
| 7,095,233 B1 | 8/2006 | Tabanou et al. | |
| 7,183,778 B2 * | 2/2007 | Homan | G01V 3/20 |
| | | | 324/691 |
| 7,723,989 B2 * | 5/2010 | He | E21B 47/01 |
| | | | 324/324 |
| 7,782,060 B2 | 8/2010 | Clark et al. | |
| 7,888,941 B2 | 2/2011 | San Martin et al. | |
| 2002/0119576 A1 | 8/2002 | Sklar et al. | |
| 2009/0322338 A1 | 12/2009 | Godefroy et al. | |

OTHER PUBLICATIONS

PCT International Preliminary Report on Patentability, dated Apr. 29, 2014, Appl No. PCT/US2012/030851, "Downhole Fluid Resistivity Sensor Systems and Methods," filed Mar. 28, 2012, 9 pgs.

* cited by examiner

DOWNHOLE FLUID RESISTIVITY SENSOR SYSTEMS AND METHODS

BACKGROUND

It is often desirable to measure properties of downhole fluids in situ, as this permits a driller or field engineer to measure and monitor the state (e.g., liquid or gas) and type (e.g. water or hydrocarbon) of such fluids as they exist in the formation or at a specific point in the well. Once such fluids have mingled with other fluids and/or flowed to a different temperature and pressure environment, they may undergo state and chemical changes that make it difficult for the driller or engineer to discern the original state and location of the downhole fluids. Moreover, these changes may be undesirable (e.g., scaling, deposition) and preventable. Accordingly, there exist a number of sensors for measuring in situ fluid properties.

Electrical resistivity is one fluid property that can be helpful. The resistivity of connate water tends to be very low due to the presence of solute ions, whereas the resistivity of hydrocarbons or gases is generally much higher. Thus resistivity of a formation fluid can be indicative of commercial value (e.g., hydrocarbon reservoirs). Similarly, the resistivity of a borehole fluid can be indicative of elevated danger, as a sudden change in drilling fluid conductivity would likely represent an influx of fluid from a high pressure formation.

A borehole, particularly during drilling operations, poses many challenges as an operating environment for a sensor. The sensor may be exposed to elevated temperatures and pressures, severe vibration, and in many cases prolonged exposure. In the case of a wireline tool which is re-used in different wells, the temperature and pressure conditions are cycled. In such circumstances, the components and seals of a sensor can degrade rapidly. Existing resistivity sensors leave much room for improvement.

BRIEF DESCRIPTION OF THE DRAWINGS

Accordingly, there are disclosed in the drawings and the following description specific embodiments of downhole fluid resistivity sensors and methods. In the drawings.

Figure 1:
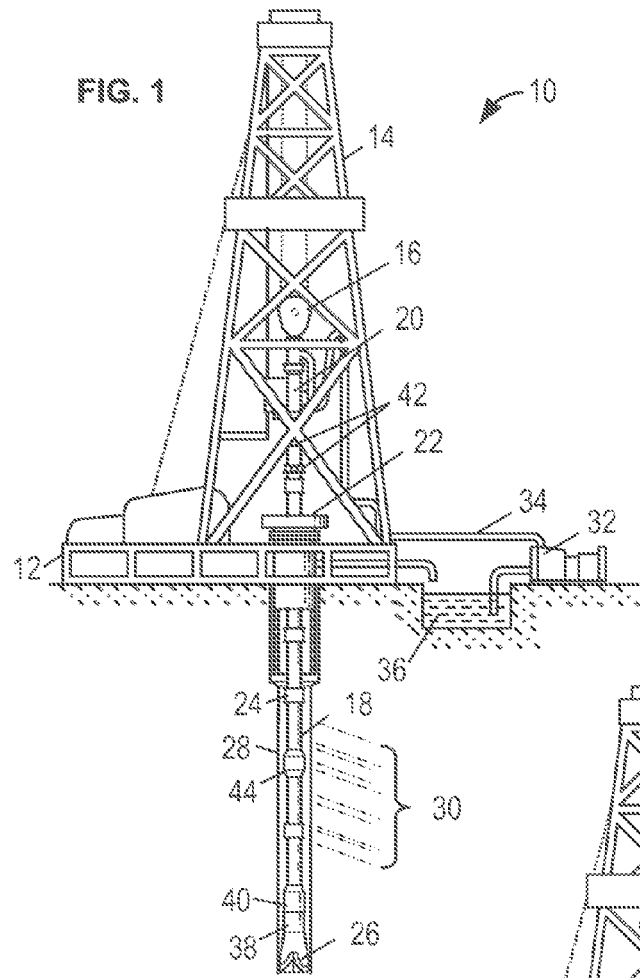
FIG. 1 shows an illustrative logging while drilling (LWD) environment.

It should be understood, however, that the specific embodiments given in the drawings and detailed description thereof do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Turning now to the figures, FIG. 1 shows an illustrative logging while drilling (LWD) system 10 including a logging tool 38 having a fluid resistivity sensor. A drilling platform 12 is equipped with a derrick 14 that supports a hoist 16 for raising and lowering a drill string 18. The hoist 16 suspends a top drive 20 that is used to rotate the drill string 18 and to lower the drill string through a well head 22. Sections of the drill string 18 are connected by threaded connectors 24. Connected to the lower end of the drill string 18 is a drill bit 26. As the drill bit 26 rotates, it creates a borehole 28 that passes through various formations 30. A pump 32 circulates drilling fluid through a supply pipe 34 to top drive 20, downhole through the interior of drill string 18, through orifices in drill bit 26, back to the surface via an annulus around drill string 18, and into a retention pit 36. The drilling fluid transports cuttings from the borehole into the pit 36 and aids in maintaining the integrity of the borehole 28.

A bottom-hole assembly of the LWD system 10 includes the drill bit 26, the logging tool 38, and a telemetry sub 40. As the drill bit 26 extends the borehole through the formations, the logging tool 38 collects measurements relating to various formation properties and to the properties of the borehole itself. For example, the logging tool 38 uses the fluid resistivity sensor to measure electrical resistivities of fluids in the borehole 28. The logging tool 38 may take the form of a drill collar, i.e., a thick-walled tubular that provides weight and rigidity to aid the drilling process. In some embodiments, the telemetry sub 40 transfers measurements made by the logging tool 38 to a surface receiver 42 coupled to tubing below the top drive 20. In the embodiment of FIG. 1, the telemetry sub 40 transmits telemetry signals in the form of acoustic vibrations in the tubing of the drill string 18. One or more repeater modules 44 may be optionally provided along the drill string 18 to receive and retransmit the telemetry signals. In other embodiments, the telemetry sub 40 may collect and store tool measurements made by the logging tool 38 for later retrieval when the bottom-hole assembly is brought back to the surface.

Figure 2:
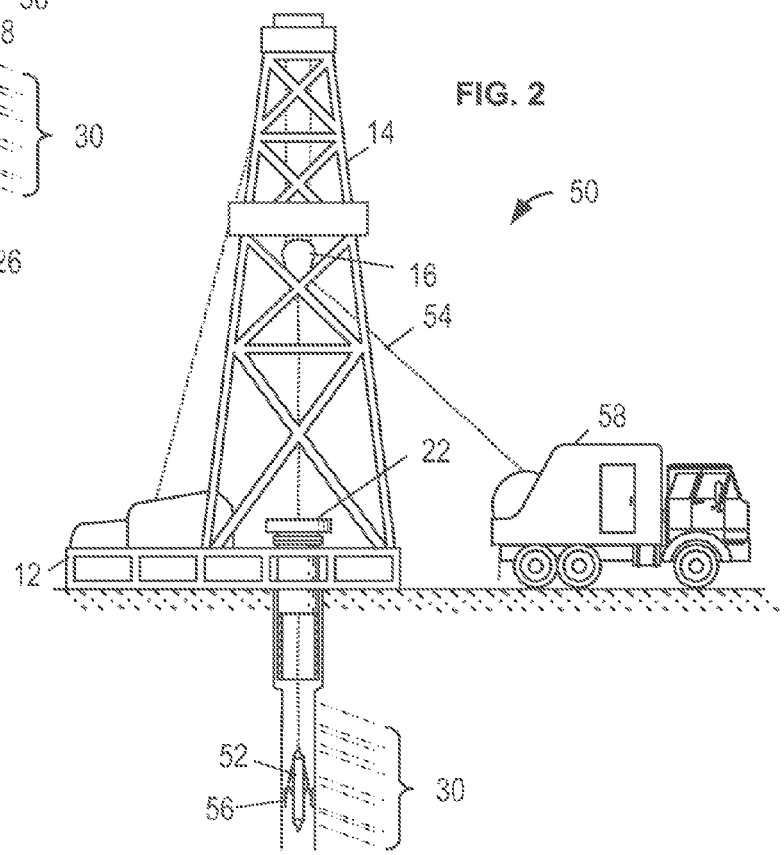
FIG. 2 shows an illustrative wireline logging environment.

FIG. 2 is a diagram of an illustrative wireline logging system 50 including a wireline logging tool 52. Like items are labeled similarly in FIG. 1 and FIG. 2. At various times during the drilling process, the drill string 18 of FIG. 1 is removed from the borehole 28 to allow the use of the wireline logging tool 52. In the embodiment of FIG. 2, the wireline logging tool 52 is a multi-instrument sonde suspended by a cable 54 having conductors for transporting power to the tool and telemetry from the tool to the surface. The wireline logging tool 52 includes arms 56 that center the tool within the borehole and/or press the tool against the borehole wall. A logging facility 58 collects measurements from the logging tool 52, and includes computing facilities for processing and storing the measurements gathered by the logging tool 52.

Figure 3:
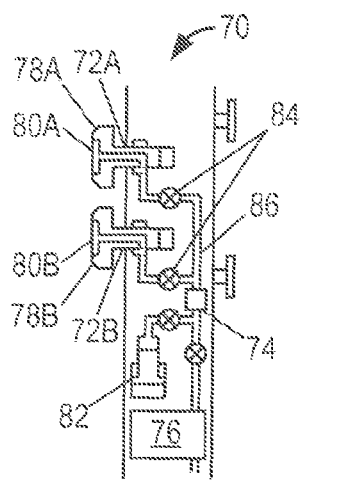
FIG. 3 shows an illustrative formation fluid sampling tool having a downhole fluid resistivity sensor.

Among the instruments that may be included in wireline logging tool 52 is a formation fluid sampling tool having a fluid resistivity sensor. FIG. 3 shows one such formation fluid sampling tool 70. In the embodiment of FIG. 3, the formation fluid sampling tool 70 includes two probes 72A and 72B for contacting a formation in a borehole, a fluid resistivity sensor 74, and a multi-chamber sample collection cassette 76. The fluid sampling tool 70 may also include one or more spectrometers.

The probe 72A includes a cup-shaped sealing pad 78A at and end of an extendable and retractable arm. Similarly, the probe 72B includes a cup-shaped sealing pad 78B at and end of an extendable and retractable arm. During use, the arms of the probes 72A and 72B are extended from one side of the formation fluid sampling tool 70 as rams are extended from the opposing side, forcing the probes into a sealing contact with the borehole wall. The probe orifices 80A and 80B make contact with the formation.

The probes 72A and 72B are coupled to a piston pump 82 to draw formation fluid samples in from the formation via the orifices 80A and 80B. With the cooperation of an arrangement of valves 84, the piston pump 82 regulates a flow of various fluids in and out of the formation fluid sampling tool 70 via a flow line 86. The fluid resistivity sensor 74 measures the electrical resistivity of formation fluid flowing through the flow line 86. Ultimately, sampled formation fluid is either exhausted to the borehole or captured in one of the sample chambers of the sample collection cassette 76.

Figure 4A:
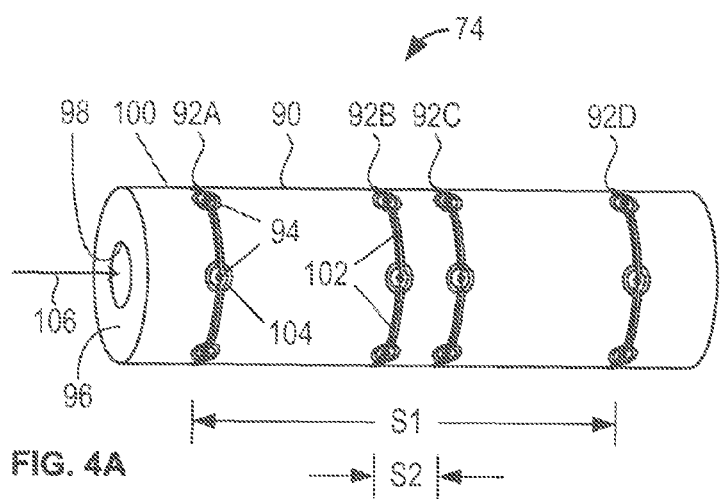
FIGS. 4A and 4B show an illustrative embodiment of a downhole fluid resistivity sensor.
Figure 4B:
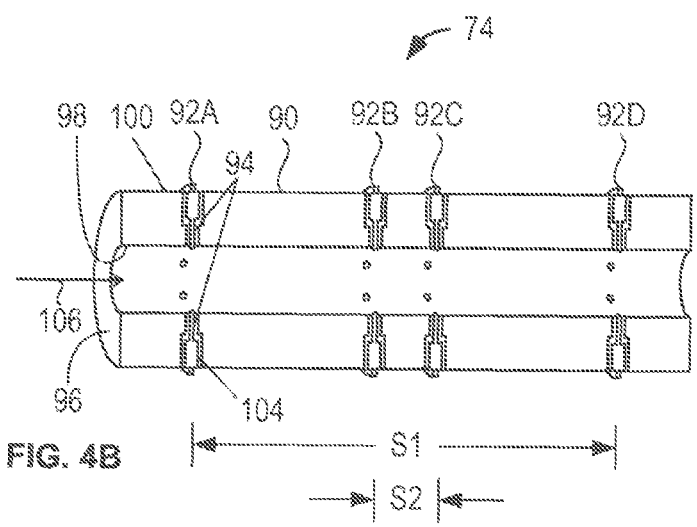

FIGS. 4A and 4B show one embodiment of a suitable fluid resistivity sensor 74 for use in the wireline tool system or the logging while drilling system. FIG. 4A is an external isometric view of the fluid resistivity sensor 74, and FIG. 4B is a cutaway isometric view of the fluid resistivity sensor 74. In the embodiment of FIGS. 4A and 4B, the resistivity sensor 74 includes a hollow cylinder 90 (i.e., a tube) made of an electrically insulating material and having four spaced apart and electrically conductive electrodes 92A, 92B, 92C, and 92D disposed axially along a length of the hollow cylinder 90. Each of the electrodes 92A-92D includes six electrically conductive pins 94 extending through a wall 96 of the hollow cylinder 90 between an outer surface 100 and an inner surface 98. The six conductive pins 94 of each of the electrodes 92A-92D are circumferentially spaced apart about a cross section of the hollow cylinder 90. In the embodiment of FIGS. 4A and 4B, the six pins 94 of each of the four electrodes 92A-92D have equal angular spacings around an axis of the hollow cylinder 90, and are electrically bonded together at the outer surface 100 of the hollow cylinder 90 by conductive straps 102 to form four corresponding equipotential planes. In other embodiments, each of the electrodes 92A-92D may include three or more electrically conductive pins 94.

The hollow cylinder 90 is preferably made of an electrically insulating material that can withstand the high temperatures and pressures present in well boreholes. In addition, the material of the hollow cylinder 90 is preferably substantially impervious to formation fluids at the high temperatures and pressures present in well boreholes. Further, the material of the hollow cylinder 90 is preferably suitable for forming seals between the pins of the four electrodes 92A-92D and the hollow cylinder 90 that can withstand formation fluids at the high temperatures and pressures present in well boreholes.

In some embodiments, the hollow cylinder 90 is made of a ceramic material comprising alumina ($Al_2O_3$) in an amount sufficient to achieve a desired thermal conductivity and/or dielectric strength of the ceramic material. Other suitable ceramics include silicon nitride ($Si_3N_4$), aluminum nitride (AlN), aluminum oxynitride (AlON), and any combination of the ceramic materials described above.

In the embodiment of FIGS. 4A and 4B, each of the pins 94 is physically bonded to an adjacent portion of the hollow cylinder 90 via a bond 104. The bonds 104 are preferably robust enough to withstand formation fluids at the high temperatures and pressures present in well boreholes, and multiple thermal cycles that expectedly occur during repeated use. In some embodiments, a sealing material is positioned between the pins 94 and the hollow cylinder 90 and used to form the bonds 104. In some embodiments, the sealing material includes borosilicate glass. Very small particles of borosilicate glass are positioned between the pins 94 and inner surfaces of holes in the hollow cylinder 90 adapted to receive the pins 94. The resultant assembly is heated in a furnace at a temperature sufficient to fuse the borosilicate glass. The fused borosilicate glass physically bonds to the pins 94 and the inner surfaces of the holes in the hollow cylinder 90, forming the bonds 104.

In other embodiments, a soldering or brazing process may be used to form the bonds 104. For example, a layer of a base metal may be formed on inner surfaces of the holes in the hollow cylinder 90 adapted to receive the pins 94. A thin layer of a selected filler metal may be positioned between the pins 94 and the base metal lined holes of the hollow cylinder 90. The resulting assembly may then be heated to a temperature greater than a melting point of the filler metal. The molten filler metal bonds to the pins 94 and the base metal lined holes of the hollow cylinder 90, forming the bonds 104.

The pins 94 and the connecting straps 102 of the electrodes 92A-92D are preferably made of a non-corrosive metal or metal alloy. The coefficients of thermal expansion of the materials forming the hollow cylinder 90, the bonds 104, and the pins 94 are preferably selected and/or adjusted (e.g., by the additions of other materials) such that the components do not fail under the high temperatures and pressures present in well boreholes and the multiple thermal cycles that expectedly occur during repeated use. In some embodiments, the pins 94 and the connecting straps 102 of the electrodes 92A-92D are made of stainless steel.

In the embodiment of FIGS. 4A and 4B, ends of the pins 94 extend into an inner bore of the hollow cylinder 90 defined by the inner surface 98. A diameter of the inner bore may be, for example, about 5.6 millimeters (mm), and a thickness of the wall 96 may be, for example, approximately 6.4 mm. In some embodiments, the ends of the pins 94 of each of the electrodes 92A-92D extending into the inner bore are electrically bonded together by one or more electrically conductive strap(s).

During use of the fluid resistivity sensor 74, a fluid 106 flows through the inner bore of the hollow cylinder 90, and is in contact with the inner surface 98 of the hollow cylinder 90 and the ends of the pins 94. The fluid may be, for example, a formation fluid or a drilling fluid (e.g., drilling mud). An electric circuit injects an electric current into the fluid 106 via the outer two electrodes 92A and 92D, and measures a resulting electric voltage produced between the inner two electrodes 92B and 92C. The volume resistivity 'ρ' of the fluid 106 is determined using:

$$\rho = k\left(\frac{V}{I}\right)$$

where 'V' is the measured voltage between the inner electrodes 92B and 92C, 'I' is the current injected between the outer electrodes 92A and 92D, and 'k' is a constant determined during calibration. The current I may be an alternating current (AC) or a direct current (DC).

In the embodiment of FIGS. 4A and 4B, a distance 'S1' exists between the outer electrodes 92A and 92D, and a distance 'S2' exists between the inner two electrodes 92B and 92C. The voltage V measured voltage between the inner electrodes 92B and 92C is expectedly directly proportional to the distance S2 between the two inner electrodes, and larger voltage measurements are desirable for noise rejection purposes. On the other hand, it is believed that an electric field formed between the outer electrodes 92A and 92D is more uniform near a midpoint between the outer electrodes.

In some embodiments, S2 is centered on the midpoint between the outer electrodes 92A and 92D, and is made less than or equal to (S1)/2 to take advantage of the more uniform electric field near the midpoint.

Figure 5A:
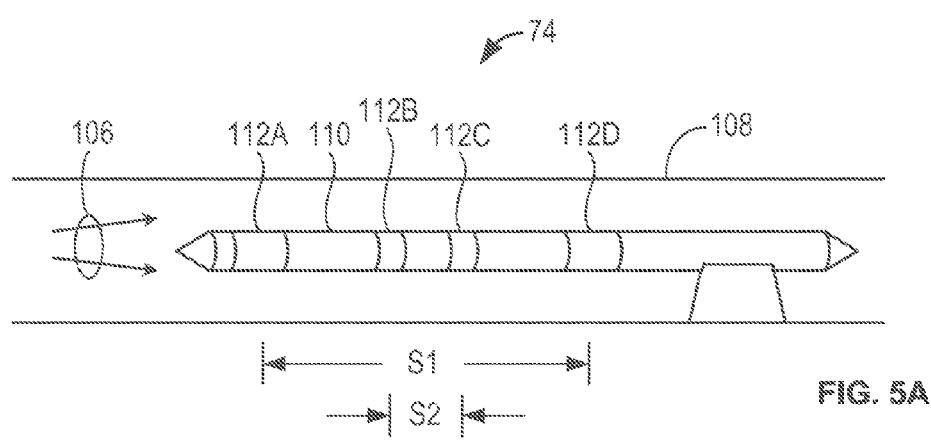
FIGS. 5A and 5B show a second illustrative embodiment of a downhole fluid resistivity sensor.
Figure 5B:
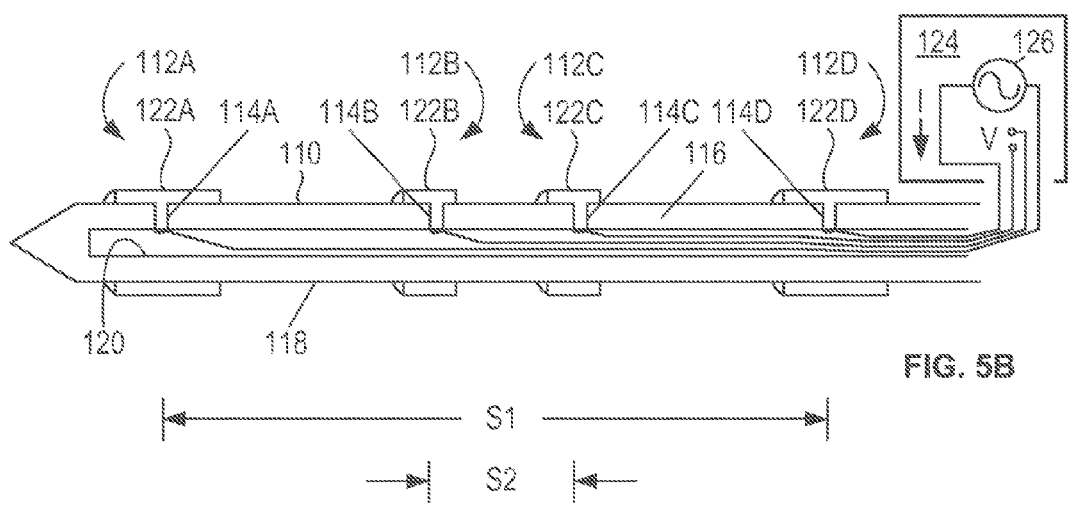

FIGS. 5A and 5B show another embodiment of a fluid resistivity sensor 74. FIG. 5A is a side view of a portion of the fluid resistivity sensor 74, and FIG. 5B is a cutaway side view of the fluid resistivity sensor 74. In the embodiment of FIGS. 5A and 5B, the resistivity sensor 74 includes a flow line 108 for containing the fluid 106 and a hollow cylinder 100 (i.e., a tube) closed and sealed at both ends and positioned within the flow line 108. The hollow cylinder 110 is made of an electrically insulating material and has four spaced apart and electrically conductive electrodes 112A, 112B, 112C, and 112D disposed axially along a length of the hollow cylinder 110. Each of the electrodes 112A-112D has an electrically conductive pin extending through a wall of the hollow cylinder 110, where the pin is in electrical contact with an electrically conductive band formed on an outer surface of the hollow cylinder 110.

In the embodiment of FIGS. 5A and 5B, the electrically conductive electrode 112A includes an electrically conductive pin 114A extending through a wall 116 of the hollow cylinder 110 between an outer surface 118 and an inner surface 120. The pin 114A is in electrical contact with an electrically conductive band 122A formed on the outer surface 118 of the hollow cylinder 110. Similarly, the electrically conductive electrodes 112B-112D include respective electrically conductive pins 114B-114D extending through the wall 116 of the hollow cylinder 110 between the outer surface 118 and the inner surface 120. The pins 114B-114D are in electrical contact with respective electrically conductive bands 122B-122D formed on the outer surface 118 of the hollow cylinder 110.

Like the hollow cylinder 90 described above, the hollow cylinder 110 is preferably made of an electrically insulating material that can withstand the high temperatures and pressures present in well boreholes. In addition, the material of the hollow cylinder 110 is preferably substantially impervious to formation fluids at the high temperatures and pressures present in well boreholes. Further, the material of the hollow cylinder 110 is preferably suitable for forming seals between the electrically conductive bands 122A-122D and the hollow cylinder 110 that can withstand formation fluids at the high temperatures and pressures present in well boreholes, and multiple thermal cycles that expectedly occur during repeated use.

In some embodiments, the hollow cylinder 110 is made of a ceramic material comprising alumina ($Al_2O_3$) in an amount sufficient to achieve a desired thermal conductivity and/or dielectric strength of the ceramic material. Other suitable ceramics include silicon nitride ($Si_3N_4$), aluminum nitride (AlN), aluminum oxynitride (AlON), or any combination of the ceramic materials described above.

In some embodiments, a sealing material is positioned between the bands 122A-122D and the hollow cylinder 110. For example, in some embodiments the sealing material is a viscous liquid material that bonds well to the hollow cylinder 110 and the bands 122A-122D, and dries, cures, or vulcanizes to form a seal. A suitable liquid sealing material is an epoxy material. In other embodiments, the sealing material includes borosilicate glass. Very small particles of borosilicate glass are positioned between the bands 122A-122D and corresponding portions of the outer surface 118 of the hollow cylinder 110. The resultant assembly is heated in a furnace at a temperature sufficient to fuse the borosilicate glass. The fused borosilicate glass physically bonds to the bands 122A-122D to the corresponding portions of the outer surface 118, forming the seals. In other embodiments, a soldering or brazing process as described above may be used to form the seals between the bands 122A-122D and the corresponding portions of the outer surface 118 of the hollow cylinder 110.

The pins 114A-114D and the hands 122A-122D are preferably made of a non-corrosive metal or metal alloy. Where the seals between the bands 122A-122D and the corresponding portions of the outer surface 118 of the hollow cylinder 110 are rigid, the coefficients of thermal expansion of the materials forming the hollow cylinder 110, the seals, the pins 114A-114D, and the bands 122A-122D are preferably carefully selected and/or adjusted (e.g., by the additions of other materials) such that the components do not fail under the high temperatures and pressures present in well boreholes and the multiple thermal cycles that expectedly occur during repeated use. In some embodiments, the pins 114A-114D and the bands 122A-122D are made of stainless steel.

During use of the fluid resistivity sensor 74 of FIGS. 5A and 5B, the fluid 106 flows through the flow line 108, and is in contact with the outer surface 118 of the hollow cylinder 110 and the bands 122A-122D of the electrodes 112A-112D. An electric circuit 124 injects an electric current 'I' into the fluid 106 via the outer two electrodes 112A and 112D, and measures a resulting electric voltage 'V' produced between the inner two electrodes 112B and 112C. The volume resistivity 'ρ' of the fluid 106 is again determined using:

$$\rho = k\left(\frac{V}{I}\right)$$

where 'k' is a constant determined during calibration. The current I may be an alternating current (AC) or a direct current (DC). In the embodiment of FIG. 5B, the circuit 124 includes an AC voltage source 126 to generate the electric current 'I' in the fluid 106. A frequency of the AC voltage source may be between, for example, 100 hertz (Hz) and 100 kilohertz (kHz).

In some embodiments, the electric circuit 124 produces an electrical signal that conveys the calculated value of the volume resistivity ρ. The electric circuit 124 may also display the calculated value of the volume resistivity ρ. For example, the circuit 124 may include a display monitor in the logging facility 58 of FIG. 2, and the circuit 124 may display the calculated value of the volume resistivity ρ on the display monitor.

In the embodiment of FIGS. 5A and 5B, the distance S1 exists between the outer electrodes 112A and 112D, and the distance S2 exists between the inner two electrodes 112B and 112C. For the reasons stated above, in some embodiments S2 is centered on the midpoint between the outer electrodes 112A and 112D, and is made less than or equal to (S1)/2 to take advantage of the more uniform electric field near the midpoint.

In the above described embodiments, the fluid resistivity sensor 74 of FIGS. 3, 4A-4B, and 5A-5B is used to determine the resistivity of a fluid (e.g., the fluid 106 in 4A-4B and 5A-5B) based on a real part of an electrical impedance of the fluid. The fluid resistivity sensor 74 may also be used to measure a complex electrical impedance of the fluid, and the complex impedance may be used to determine other electrical characteristics of the fluid, such as a permittivity of the fluid. For example, The circuit 124 of FIG. 5B may create an oscillatory electric field between the outer electrodes 112A and 112D, and measure a differential voltage phase and magnitude induced by the electric field between the inner electrodes 112B and 112C. The circuit 124 may use the differential voltage phase and magnitude to determine a permittivity of the fluid. See, for example, U.S. Pat. No. 7,888,941, incorporated herein by reference in its entirety.

Figure 6:
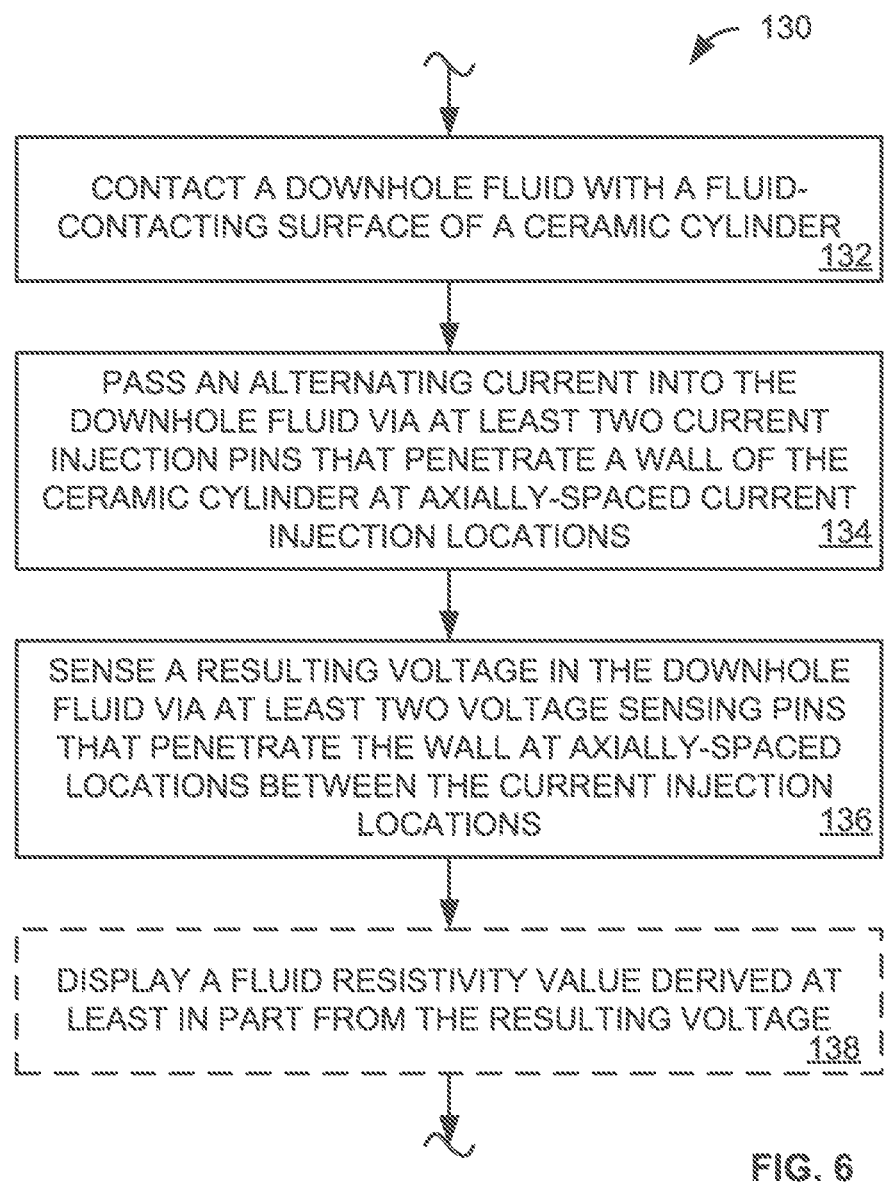
FIG. 6 is a flowchart of an illustrative fluid resistivity measurement method.

FIG. 6 is a flowchart of a fluid resistivity measurement method 130 that may be used in the LWD system 10 of FIG. 1 or the wireline logging system 50 of FIG. 2. The method 130 includes contacting a downhole fluid (e.g., the fluid 106 of FIGS. 4A, 4B, and 5A) with a fluid-contacting surface of a ceramic cylinder (e.g., the ceramic cylinder 90 of FIGS. 4A-4B or the ceramic cylinder 110 of FIGS. 5A-5B), as represented by the block 132. The fluid-contacting surface may be an inner bore of the ceramic cylinder (e.g., an inner bore of the ceramic cylinder 90 of FIGS. 4A-4B defined by the inner surface 98), where fluid flow is provided through the inner bore. Alternately, the fluid-contacting surface may be an outer surface of the ceramic cylinder (e.g., the outer surface 118 of the ceramic cylinder 110 of FIGS. 5A-5B), where the ceramic cylinder is immersed in the downhole fluid.

As represented by a block 134, the method 130 also includes passing an alternating current into the downhole fluid via at least two current injection pins that penetrate a wall of the ceramic cylinder at axially-spaced current injection locations (e.g., the pins 94 of the electrodes 92A and 92D of FIGS. 4A and 4B, or the pins 114A and 114D of the respective electrodes 112A and 112D of FIGS. 5A and 5B). Each of the current injection pins may be one of a set of electrically-connected pins that contact the fluid at circumferentially-spaced positions. For example, as described above, each of the current injection electrodes 92A and 92D of FIGS. 4A and 4B has six pins 94.

The method 130 also includes sensing a resulting voltage in the downhole fluid via at least two voltage sensing pins that penetrate the wall at axially-spaced locations between the current injection locations (e.g., the pins 94 of the electrodes 92B and 92C of FIGS. 4A and 4B, or the pins 114B and 114C of the respective electrodes 112B and 112C of FIGS. 5A and 5B), as represented by the block 136. Each of the voltage sensing pins may be one of a set of electrically-connected pins that contact the fluid at circumferentially-spaced positions. For example, as described above, each of the voltage sensing electrodes 92B and 92C of FIGS. 4A and 4B has six pins 94.

As represented by the block 138, the method 130 may optionally include displaying a fluid resistivity value derived at least in part from the resulting voltage. For example, as described above, the circuit 124 of FIG. 5B may include a display monitor in the logging facility 58 of FIG. 2, and the circuit 124 may display the calculated value of the volume resistivity ρ on the display monitor.

Numerous variations and modifications will become apparent to those skilled in the art once the above disclosure is fully appreciated. It is intended that the following claims be interpreted to embrace all such variations and modifications.

What is claimed is:

1. A formation testing tool that comprises:
   a downhole fluid resistivity sensor having a ceramic cylinder with a fluid-contacting surface and at least four metal pins that penetrate a wall of the cylinder at axially-spaced locations, the pins being bonded to the ceramic to form a pressure seal;
   a probe that contacts a borehole wall; and
   a pump that extracts a formation fluid sample via the probe and places the fluid sample in contact with said fluid-contacting surface,
   wherein the tool employs the at least four metal pins to perform a four-point resistivity measurement on said fluid sample.

2. The tool of claim 1, wherein at each of said axially-spaced locations, a set of multiple, electrically-connected pins penetrates the wall to contact the fluid sample at circumferentially-spaced positions.

3. The tool of claim 1, wherein the fluid-contacting surface defines an inner bore of the cylinder.

4. The tool of claim 1, wherein the fluid-contacting surface is an outer surface of the cylinder.

5. A downhole fluid resistivity sensor that comprises:
   a ceramic cylinder having a fluid-contacting surface;
   at least four metal pins that penetrate a wall of the ceramic cylinder at axially-spaced locations, the pins bonded to the ceramic to form a pressure seal.

6. The sensor of claim 5, further comprising a circuit that injects current into a fluid via an outer two of said pins and measures a resulting voltage via an inner two of said pins, wherein the circuit further provides an indication of fluid resistivity based at least in part on said resulting voltage.

7. The sensor of claim 5, wherein at each of said axially-spaced locations, a set of multiple pins penetrates the wall to contact the fluid at circumferentially-spaced positions.

8. The sensor of claim 7, wherein each set of multiple pins includes at least four electrically-connected pins.

9. The sensor of claim 7, wherein each set of multiple pins includes at least six electrically-connected pins.

10. The sensor of claim 5, wherein the fluid-contacting surface is an outer surface of the ceramic cylinder.

11. The sensor of claim 10, wherein the fluid-contacting surface contacts drilling fluid.

12. The sensor of claim 5, wherein the fluid-contacting surface defines an inner bore of the cylinder.

13. The sensor of claim 5, wherein the fluid-contacting surface contacts a formation fluid sample.

14. A downhole fluid resistivity measurement method that comprises:
   contacting a downhole fluid with a fluid-contacting surface of a ceramic cylinder;
   passing an alternating current into the downhole fluid via at least two current injection pins that penetrate a wall of the ceramic cylinder at axially-spaced current injection locations; and
   sensing a resulting voltage in the downhole fluid via at least two voltage sensing pins that penetrate the wall at axially-spaced locations between the current injection locations.

15. The method of claim 14, further comprising displaying a fluid resistivity value derived at least in part from the resulting voltage.

16. The method of claim 14, wherein each of said current injection pins is one of a set of electrically-connected pins that contact a fluid at circumferentially-spaced positions.

17. The method of claim 16, wherein each of said voltage sensing pins is one of a set of electrically-connected pins that contact the fluid at circumferentially-spaced positions.

18. The method of claim 14, wherein the fluid-contacting surface defines an inner bore of the cylinder, and the method further comprises providing a fluid flow through the inner bore.

19. The method of claim 14, wherein the fluid-contacting surface is an outer surface of the ceramic cylinder and the method further comprising immersing the cylinder in a downhole fluid.

* * * * *

UNITED STATES PATENT AND TRADEMARK OFFICE
CERTIFICATE OF CORRECTION

PATENT NO. : 9,575,199 B2  
APPLICATION NO. : 14/388193  
DATED : February 21, 2017  
INVENTOR(S) : Wei Zhang et al.

Page 1 of 1

It is certified that error appears in the above-identified patent and that said Letters Patent is hereby corrected as shown below:

Column 6, Line 7, the word "hands" should read as --bands--

Signed and Sealed this  
Twenty-ninth Day of August, 2017

Joseph Matal  
*Performing the Functions and Duties of the*  
*Under Secretary of Commerce for Intellectual Property and*  
*Director of the United States Patent and Trademark Office*